United States Patent
Jeon et al.

(10) Patent No.: US 9,856,403 B2
(45) Date of Patent: Jan. 2, 2018

(54) METHOD OF PREPARING PRESSURE-SENSITIVE ADHESIVE PRODUCT

(71) Applicant: LG CHEM, LTD., Seoul (KR)

(72) Inventors: Jong Rok Jeon, Daejeon (KR); Se Woo Yang, Daejeon (KR); Joon Hyung Kim, Daejeon (KR); Yong Sung Goo, Daejeon (KR); Suk Ky Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 866 days.

(21) Appl. No.: 14/088,237

(22) Filed: Nov. 22, 2013

(65) Prior Publication Data

US 2014/0079926 A1     Mar. 20, 2014

Related U.S. Application Data

(63) Continuation of application No. PCT/KR2013/004266, filed on May 14, 2013.

(30) Foreign Application Priority Data

May 14, 2012 (KR) .......... 10-2012-0050922
May 14, 2013 (KR) .......... 10-2013-0054349

(51) Int. Cl.
*C09J 7/00* (2006.01)
*C09J 7/02* (2006.01)
(Continued)

(52) U.S. Cl.
CPC ........... *C09J 7/0207* (2013.01); *C09J 7/00* (2013.01); *C09J 7/0267* (2013.01); *C09J 133/08* (2013.01);
(Continued)

(58) Field of Classification Search
None
See application file for complete search history.

(56) References Cited

U.S. PATENT DOCUMENTS 5,599,602 A * 2/1997 Leonard .............. B29C 47/0019
428/167
2004/0127594 A1* 7/2004 Yang .................. C08F 290/061
522/114
(Continued)

FOREIGN PATENT DOCUMENTS

EP      0259094 A2      3/1988
EP      2353736 A1      8/2011
(Continued)

OTHER PUBLICATIONS

Benedek et al., Technology of Pressure-Sensitive Adhesives and Products, CRC Press, (2008), pp. (Chapter 2) 32.*

*Primary Examiner* — Lisha Jiang
(74) *Attorney, Agent, or Firm* — Dentons US LLP

(57) ABSTRACT

The present application relates to a method of preparing a pressure-sensitive adhesive product and the pressure-sensitive adhesive product. According to the present application, the pressure-sensitive adhesive product having different physical properties on both surfaces, for example, having different peeling strengths on both surfaces, or having a structure in which a pressure-sensitive adhesive and a support are sequentially formed may be efficiently provided.

12 Claims, 1 Drawing Sheet

(51) Int. Cl.
*C09J 133/08* (2006.01)
*C09J 4/00* (2006.01)

(52) U.S. Cl.
CPC ............ *C09J 4/00* (2013.01); *C09J 2201/134* (2013.01); *C09J 2201/36* (2013.01); *C09J 2201/606* (2013.01); *C09J 2201/622* (2013.01); *C09J 2433/00* (2013.01); *C09J 2475/006* (2013.01); *Y10T 428/24942* (2015.01)

(56) References Cited

U.S. PATENT DOCUMENTS

| | | | |
|---|---|---|---|
| 2005/0202073 A1* | 9/2005 | Jackson | A61K 9/7061 424/449 |
| 2010/0092772 A1* | 4/2010 | Nishida | B32B 7/12 428/345 |
| 2010/0096175 A1* | 4/2010 | Ishimatsu | C09J 7/00 174/260 |
| 2011/0318579 A1* | 12/2011 | Husemann | C09J 7/00 428/355 AC |

FOREIGN PATENT DOCUMENTS

| | | |
|---|---|---|
| EP | 2551314 A1 | 1/2013 |
| JP | 07-285158 | 10/1995 |
| JP | 08-199122 | 6/1996 |
| JP | 2006-182810 | 7/2006 |
| JP | 2009-084507 | 4/2009 |
| KR | 10-2006-0123491 | 12/2006 |
| KR | 10-2007-0016718 | 2/2007 |
| KR | 10-2010-0021530 | 2/2010 |
| KR | 10-2012-0036691 | 4/2012 |
| WO | 9608319 A2 | 3/1996 |
| WO | 02066571 A2 | 8/2002 |

* cited by examiner

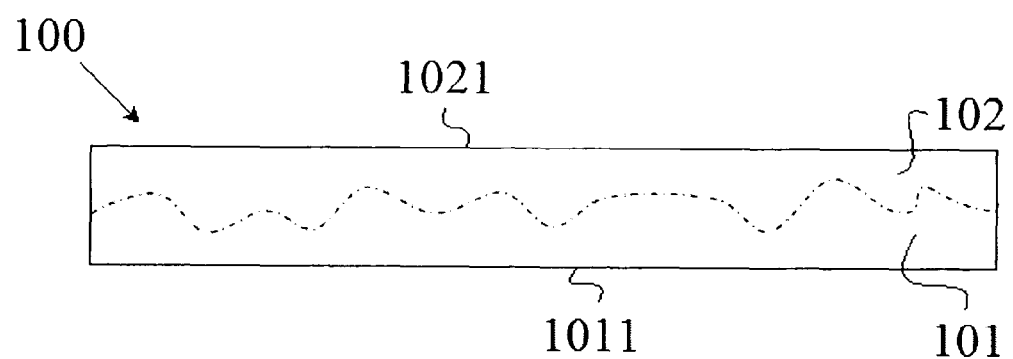

METHOD OF PREPARING PRESSURE-SENSITIVE ADHESIVE PRODUCT

This application is a Continuation Bypass of International Application No. PCT/KR2013/004266, filed May 14, 2013, and claims priority to and the benefit of Korean Patent Application Nos. 10-2012-0050922, filed May 14, 2012 and 10-2013-0054349, filed May 14, 2013, the disclosures of which are incorporated herein by reference in their entirety.

TECHNICAL FIELD

The present application relates to a method of preparing a pressure-sensitive adhesive product and the pressure-sensitive adhesive product.

BACKGROUND ART

A pressure-sensitive adhesive product is usually provided in a structure having a pressure-sensitive adhesive layer on a support or a type of a layer having pressure-sensitive adhesive layers on both surfaces thereof. In the pressure-sensitive adhesive product, when a pressure-sensitive adhesive surface is placed on an adherent surface and a certain pressure is applied, adhesion is induced.

For example, when at least two materials are attached using the pressure-sensitive adhesive product, ideally, both surfaces of the pressure-sensitive adhesive product necessarily have required physical properties, and in many cases, physical properties required for the both surfaces are different from each other. For example, when a glass base is attached to a polymer base, it may be suitable that one surface of the pressure-sensitive adhesive product has an affinity to the glass base, and the other surface of the pressure-sensitive adhesive product has an affinity to a polymer base.

DISCLOSURE

Technical Problem

The present application is directed to providing a method of preparing a pressure-sensitive adhesive product and the pressure-sensitive adhesive product.

Technical Solution

According to an exemplary embodiment of the present application, a method of preparing a pressure-sensitive adhesive product is provided. The exemplary method may include forming a layer of first composition (hereinafter, referred to as "first layer"), and forming a layer of second composition (hereinafter, referred to as "second layer") on the first layer.

In one example, the layer of first composition and the layer of second composition may be sequentially formed on a suitable base layer or a released surface of a releasable base layer. Alternatively, the layer of second composition may be directly formed on the layer of first composition.

The first and second compositions may have different viscosities at the same temperature, for example, at room temperature. The term "room temperature" is a temperature in nature, which is not decreased or increased, and may be, for example, approximately 10 to 30, 15 to 30, 20 to 30, 25, or 23° C. In addition, the "viscosity of the first and second compositions" used herein may refer to viscosity at a point of time when the compositions are coated to form a pressure-sensitive adhesive product. In one example, the first and second compositions may have a difference in viscosity at room temperature which is greater than or equal to 500, 600, 700, 800, 900, 1,000, 2,000, 3,000, 4,000, or 5,000 cps. The first and second compositions may have the above-described difference in viscosity at room temperature, and the first composition formed as a layer in a lower portion may have a higher viscosity than the second composition. In one example, when the first and second compositions have the above-described viscosity difference, and the layer of first composition having a higher viscosity, that is, the first layer is formed below, and the layer of second composition, that is, the second layer, is formed above, diffusion between the first and second layers does not occur actively. In addition, for example, at an interface between the underlying first layer and the second layer formed above, as predetermined time passes in a stable state, spontaneous diffusion between components of the compositions included in these layers may be induced. Accordingly, in the first and second layers, for example, gradients of a polymer, an oligomer, a monomer, a crosslinking agent, an initiator, or other additives may be generated in a vertical direction of a coated surface. When the layer of first composition and the layer of second composition are cured in such a state, a pressure-sensitive adhesive product having different physical properties on both surfaces may be prepared. In addition, by controlling the viscosity difference between the first and second compositions, required inter-diffusion may be induced, and thus, for example, a clearly-identified interface between a layer formed by the first layer and a layer formed by the second layer in the pressure-sensitive adhesive product after curing may not substantially exist, which can be useful in various cases. Here, the upper limit of the difference in viscosity at room temperature between the first and second compositions is not particularly limited, and the difference in viscosity may be less than or equal to, for example, 3,000, 2,500, 2,000, or 1,500 cps.

Specific viscosities of the first and second compositions are not particularly limited, as long as the difference in viscosity is as described above. In one example, the second composition forming the second layer above may have viscosity at room temperature of approximately, 10 to 70, 10 to 60, 10 to 50, 10 to 40, or 10 to 30 cps. In addition, the first composition forming the first layer below may have viscosity at room temperature of approximately 700 to 30,000, 1,000 to 30,000, 3,000 to 30,000, 5,000 to 30,000, 10,000 to 30,000, 20,000 to 25,000, or 10,000 to 20,000 cps.

In one example, the first or second composition may be a pressure-sensitive adhesive composition. The term "pressure-sensitive adhesive composition" used herein may include all kinds of compositions capable of forming a pressure-sensitive adhesive by curing or crosslinking. In addition, the term "curing or crosslinking of a pressure-sensitive adhesive composition" used herein may mean all kinds of physical or chemical interactions or reactions between components of the pressure-sensitive adhesive composition, which occur in an operation of converting the pressure-sensitive adhesive composition into a pressure-sensitive adhesive. When the pressure-sensitive adhesive composition is used as the first and second compositions, a pressure-sensitive adhesive product having different physical properties such as pressure-sensitive adhesive strength at both surfaces can be prepared. Alternatively, in the above method, the pressure-sensitive adhesive composition may be used as any one of the first and second compositions. For example, when the pressure-sensitive adhesive composition is used as the second composition, and a composition capable of forming a relatively hard layer due to a high crosslinking degree is used as the first composition, a pressure-sensitive adhesive product having a hard structure such as a polymer film on one surface, and having pressure-sensitive adhesiveness on the other surface can be eventually prepared.

As the pressure-sensitive adhesive composition, various types of known compositions may be used without particular limitation. In one example, as the pressure-sensitive adhesive composition, a solventless pressure-sensitive adhesive composition may be used. When the solventless pressure-sensitive adhesive composition is used, suitable spontaneous diffusion can be induced at the interface between the first layer and the second layer.

As the solventless pressure-sensitive adhesive composition, a composition known in the art may be used without particular limitation. In one example, as the solventless pressure-sensitive adhesive composition, a photocurable composition cured or crosslinked by light radiation may be used. In the specification, the photocurable composition may include a composition that may be cured by radiation of particle beams such as alpha-particle beams, proton beams, neutron beams, and electron beams, as well as electromagnetic waves such as microwaves, IR rays, UV rays, X rays, or gamma ($\gamma$) rays.

In one example, the photocurable pressure-sensitive adhesive composition may include a partial polymer of a monomer mixture including an acryl compound. The acryl compound may be a (meth)acrylic acid ester compound. The (meth)acrylic acid ester compound may be, but is not limited to, an alkyl (meth)acrylate such as methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, hexyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, or tetradecyl (meth)acrylate.

A monomer mixture or a pressure-sensitive adhesive composition including the same may also include a different kind of monomer besides the alkyl (meth)acrylate, as needed. Such a monomer may be a hydroxyl group-containing monomer such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, or 2-hydroxypropyleneglycol (meth)acrylate; a carboxyl group-containing monomer such as (meth)acrylic acid, 2-(meth)acryloyloxy acetic acid, fumaric acid, itaconic acid, maleic acid, or maleic anhydride; an alkoxy group-containing monomer such as 2-(2-ethoxyethoxy)ethyl (meth)acrylate; an aromatic monomer such as benzyl (meth)acrylate or phenoxyethyl (meth)acrylate; a heterocyclic residue-containing monomer such as tetrahydrofurfuryl (meth)acrylate or (meth)acryloyl morpholine; a nitrogen-containing monomer such as (meth)acrylonitrile, (meth)acrylamide, N-methyl (meth)acrylamide, or N-butoxy methyl (meth)acrylamide; a styrene-based monomer such as styrene or methyl styrene; a glycidyl (meth)acrylate; a vinyl ester of a carboxylic acid such as vinyl acetate; or a multifunctional acrylate. Here, as a multifunctional acrylate, a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantane di(meth)acrylate, or 9,9-bis[4-(2-acryloyloxyethoxy)phenyl]fluorine; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate, or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta (meth)acrylate; or a hexafunctional acrylate such as dipentaerythritol hexa(meth)acrylate, caprolactone-modified dipentaerythritol hexa(meth)acrylate, or urethane (meth)acrylate (e.g. a reaction product of an isocyanate monomer and trimethylolpropane tri(meth)acrylate) may be used. Such monomers may be blended into the monomer mixture to be applied to partial polymerization forming a partial polymer, or separately blended into a partial polymer after partial polymerization.

The kind and ratio of a specific compound blended into the monomer mixture forming the partial polymer among the above-described compounds are not particularly limited, and a suitable kind of compound may be selected and used according to a required first or second composition. In addition, a method of partially polymerizing the monomer mixture and a degree of partial polymerization are not particularly limited, either. For example, the partial polymerization may be performed by applying a known polymerization method such as bulk polymerization, and the degree of partial polymerization may be controlled in consideration of desired viscosity.

As the photocurable pressure-sensitive adhesive composition, a composition including an oligomer that is also called as a photocurable oligomer may also be used. Such a kind of photocurable pressure-sensitive adhesive composition may include a photocurable oligomer and a reactive diluent.

As the photocurable oligomer, a component conventionally used in the field of preparing a pressure-sensitive adhesive without particular limitation may be used, and as such an oligomer, so called, a urethane acrylate, a polyester acrylate, a polyether acrylate, or an epoxy acrylate may be used. Here, as the urethane acrylate, particularly, a urethane acrylate obtained by reacting a hydroxyalkyl (meth)acrylate with a multifunctional isocyanate having at least two isocyanate groups in a molecule; a urethane acrylate obtained by reacting a hydroxyalkyl acrylate with a resin obtained by reacting a polyester polyol with a multifunctional isocyanate; or a urethane acrylate obtained by reacting a hydroxyalkyl (meth)acrylate with a resin that is a reaction product between a polyether polyol and a multifunctional isocyanate may be used, as the polyester acrylate, a dehydration (condensation) product between a polyester polyol and a (meth)acrylic acid may be used, as the polyether acrylate, a polyalkyleneglycol di(meth)acrylate may be used, and as the epoxy acrylate, an addition product between an epoxy compound and a (meth)acrylic acid may be used, but the present application is not limited thereto.

The photocurable oligomer may be blended with a reactive diluent. The reactive diluents may be a monomer having a functional group that may participate in a photocuring reaction such as a (meth)acryloyl group in the molecule, and such a monomer may serve to control viscosity of the composition and achieve pressure-sensitive adhesive strength after curing. The kind of the reactive diluents is not particularly limited, and for example, a suitable kind may be selected from compounds which may form the above-described partial polymer, or may be blended into the pressure-sensitive adhesive composition including a partial polymer.

Particular kinds of the photocurable oligomer and reactive diluents in the above-described type of pressure-sensitive adhesive composition are not particularly limited, and suitable kinds may be selected and used according to a required first or second composition. In addition, blending ratios of the photocurable oligomer and reactive diluents are not particularly limited, either, and may be controlled in consideration of viscosity.

The photocurable pressure-sensitive adhesive composition including a partial polymer or a photocurable oligomer may further include a radical initiator such as a photoinitiator. Such an initiator may initiate curing or crosslinking by light radiation. As a photoinitiator, an initiator known in the art may be used without particular limitation. Such an initiator may be an α-hydroxyketone-based compound (e.g., IRGACURE 184, IRGACURE 500, IRGACURE 2959, or DAROCUR 1173; Ciba Specialty Chemicals); a phenylglyoxylate-based compound (e.g., IRGACURE 754, DAROCUR MBF; Ciba Specialty Chemicals); a benzyldimethylketal-based compound (e.g., IRGACURE 651; Ciba Specialty Chemicals); an α-aminoketone-based compound (e.g., IRGACURE 369, IRGACURE 907, IRGACURE 1300; Ciba Specialty Chemicals); a monoacyl phosphine-based compound (MAPO) (e.g., DAROCUR TPO; Ciba Specialty Chemicals); a bisacyl phosphine-based compound (BAPO) (e.g., IRGACURE 819, IRGACURE 819DW; Ciba Specialty Chemicals); a phosphine oxide-based compound (e.g., IRGACURE 2100; Ciba Specialty Chemicals); a metallocene-based compound (e.g., IRGACURE 784; Ciba Specialty Chemicals); an iodonium salt (e.g., IRGACURE 250; Ciba Specialty Chemicals); or a mixture of at least one thereof (e.g., DAROCUR 4265, IRGACURE 2022, IRGACURE 1300, IRGACURE 2005, IRGACURE 2010, IRGACURE 2020; Ciba Specialty Chemicals).

A ratio of a radical initiator in the composition is not particularly limited, and may be selected to induce suitable curing or crosslinking in consideration of components included in the composition. Generally, the radical initiator may be included in an amount of approximately 0.05 to 20 parts by weight with respect to 100 parts by weight of a curable or crosslinkable component in the composition. When the ratio of an initiator in the composition is too low, suitable curing or crosslinking may not be induced, and when the ratio of an initiator in the composition is too high, physical properties may be degraded due to remaining components, and considering these, a suitable ratio may be selected. The units "parts by weight" used herein may refer to, unless particularly defined otherwise, a weight ratio between components.

The pressure-sensitive adhesive composition may further include an additive such as a re-workability improving agent such as an antioxidant, or a fluorine or silicon compound, a tackifier, a silane coupling agent, a thermal curing agent such as an isocyanate, epoxy, aziridine, or metal chelate compound, a leveling agent, an antistatic agent, a catalyst, a low molecular weight polymer, a scatterer, a UV stabilizer, a coloring agent, a reinforcing agent, a filler, a foaming agent, a surfactant, or a plasticizer.

When the first or second composition is not a pressure-sensitive adhesive composition, the kind of the used composition is not particularly limited. Also as the composition, a solventless composition may be used, and as needed, a photocurable composition may be used. For example, as a composition capable of forming a hard layer after crosslinking or curing, the same type of composition as the previously-described pressure-sensitive adhesive composition is used, and a composition having selected kinds and ratios of components to achieve a high glass transition temperature, or a high crosslinking or curing degree may be used.

A method of forming the first and second layers using the composition is not particularly limited, and may be, for example, a known coating method. In one example, the first and second layers may be formed by bar coating, comma coating, roll coating, flow coating, dip coating, blade coating, knife coating, die coating, or spin coating, or inkjetting. In one example, the first layer may be formed by the bar coating, comma coating, roll coating, flow coating, dip coating, blade coating, die coating, or spin coating; by the bar coating, knife coating, comma coating, or blade coating; or by the bar coating or comma coating, and the second layer may be formed by inkjetting. A coating method selected as described above is preferable in terms of efficiency of a continuous process.

Thicknesses of the first and second layers formed as described above are not particularly limited, and may be selected according to a type of a desired pressure-sensitive adhesive product. In one example, for example, the first layer may be formed to have a thickness of approximately 1 to 100 μm, and the second layer may be formed to have a thickness of approximately 1 to 50 μm.

To form the pressure-sensitive adhesive product, the method may further include curing or crosslinking a multilayered structure including the first and second layers sequentially formed. The curing or crosslinking conditions are not particularly limited, and proper conditions may be selected in consideration of a desired curing or crosslinking degree or components of the composition. For example, crosslinking or curing may be performed by applying the formed multilayered structure to suitable drying, heating, aging, and/or light radiating process(es). Conditions of the heating, drying, aging and/or light radiating process(es) are not particularly limited, and may be suitably set, for example, in consideration of components of the composition.

In one example, during the curing or crosslinking operation, a curing or crosslinking rate may be selected. For example, the rate of the curing or crosslinking may be controlled such that a concentration gradient between the first and second layers is generated before the end of the curing or crosslinking. In one example, the control of the rate of the crosslinking or curing may be performed in consideration of components of the compositions forming the first and second layer, such that the curing or crosslinking can be more slowly ended than a conventional case. For example, when the composition includes a component to be cured or crosslinked by a thermal curing or aging process, a method of setting a temperature and/or time of performing the thermal curing or aging process to be lower or shorter than the conventional case may be used. In addition, in another example, when the composition includes a component cured by light radiation, the rate of curing and crosslinking may be controlled such that intensity of light radiated for curing or crosslinking is maintained at a lower level than the conventional case. For example, when any one or both of the first and second layers are formed of the photocurable composition, and a sum of thicknesses of the first and second layers is approximately 30 to 80 μm, the curing or crosslinking rate may be controlled by radiating light, for example, UV rays at an intensity of approximately 20 to 100 mJ/cm² to any one of the first and second layers. However, the conditions of the curing or crosslinking are merely an example, and control of a specific curing or crosslinking rate may be changed in consideration of probability of spontaneous diffusion according to components or viscosity of the composition used. Alternatively, the spontaneous diffusion may be controlled by controlling the curing rate, or controlling a rolling rate to form each layer, for example, when roll coating is used to form the first and/or second layer.

According to another exemplary embodiment of the present application, a pressure-sensitive adhesive product is provided. The exemplary pressure-sensitive adhesive product may be prepared by the above-described method.

FIG. 1 is a schematic diagram of an exemplary pressure-sensitive adhesive product 100. As shown in FIG. 1, the pressure-sensitive adhesive product 100 may include a first surface 1011 formed by a first layer 101 and a second surface 1021 formed by a second layer 102.

The pressure-sensitive adhesive product may be formed by being cured or crosslinked in a state in which the multilayered structure including the first and second layers is formed by the first and second compositions having a suitable viscosity difference as described above. In addition, the pressure-sensitive adhesive product may be formed by being cured or crosslinked in a state in which a gradient is generated in a thickness direction due to diffusion between components of the first and second layers induced at an interface between the first and second layers in some cases.

The pressure-sensitive adhesive product may have different physical properties on the first and second surfaces. A representative example of the physical property may be peeling strength with respect to glass. In one example, the first and second surfaces may both have pressure-sensitive adhesiveness and different peeling strengths with respect to glass. Alternatively, in another example, any one of the first and second surfaces may have pressure-sensitive adhesiveness, and the other one of the both surfaces may exhibit a film property. The term "film property" used herein may refer to a hard surface that does not exhibit pressure-sensitive adhesiveness, for example, a state of the surface serving as a support of the pressure-sensitive adhesive product.

The pressure-sensitive adhesive product exhibiting different physical properties on both surfaces may be effectively used in various uses. For example, the first and second surfaces may both exhibit pressure-sensitive adhesiveness, and a product having different pressure-sensitive adhesive characteristics on both surfaces may be effectively used when at least two kinds of adherents having different surface properties are attached thereto. For example, when glass is attached to a polymer material, one surface of the pressure-sensitive adhesive product may be designed to have an affinity to the glass, and the other surface may be designed to have an affinity to the polymer material, thereby inducing suitable attachment. In another example, one surface of the pressure-sensitive adhesive product may be designed to be a hard surface, and the other surface thereof may be designed to have suitable pressure-sensitive adhesiveness, thereby preparing a pressure-sensitive adhesive product including a pressure-sensitive adhesive layer and a support.

Advantageous Effects

According to the present application, a pressure-sensitive adhesive product having different physical properties on both surfaces, for example, a pressure-sensitive adhesive product having different peeling strengths on both surfaces or having a structure in which a pressure-sensitive adhesive and a support are sequentially formed can be effectively provided.

DESCRIPTION OF DRAWINGS

FIG. 1 is a diagram of an exemplary pressure-sensitive adhesive product.

REFERENCE NUMERALS OF DRAWINGS

100: pressure-sensitive adhesive product
101: layer formed by first layer
1011: first surface
102: layer formed by second layer
1021: second surface

MODE FOR INVENTION

Hereinafter, a method of preparing a pressure-sensitive adhesive product will be described in further detail with reference to Examples and Comparative Examples, but the scope of the present application is not limited to the following Examples.

PREPARATION OF COMPOSITION

Preparation Example 1

Preparation of Composition (A)

A composition (A) having viscosity at room temperature of approximately 1,500 cps was prepared by blending 60 parts by weight of an urethane acrylate having a weight average molecular weight measured by gel permeation chromatography (GPC) of approximately 150,000, 20 parts by weight of an acrylic acid, 19.5 parts by weight of an isobornyl acrylate, and 0.5 parts by weight of (2,4,6-trimethylbenzoyl diphenyl phosphine oxide as a TPO photoinitiator.

Preparation Example 2

Preparation of Composition (B)

A syrup-phase partial polymer having a molecular weight measured by GPC of approximately 80,000 was prepared by adding a suitable amount of di(2-ethylhexyl) peroxydicarbonate (EHPDC) as an initiator to a monomer mixture prepared by blending 60 parts by weight of a butyl acrylate, 20 parts by weight of an isobornyl acrylate, and 20 parts by weight of a hydroxyethyl acrylate, and by bulk polymerizing the resulting mixture to have a conversion ratio of approximately 99 wt %. A composition (B) having viscosity at room temperature of approximately 20 cps was prepared by blending 99 parts by weight of the prepared partial polymer, 0.5 parts by weight of a TPO photoinitiator, and 0.5 parts by weight of 1,6-hexanediol diacrylate.

Preparation Example 3

Preparation of Composition (C)

A syrup-phase partial polymer having a molecular weight measured by GPC of approximately 700,000 was prepared by adding a suitable amount of di(2-ethylhexyl) peroxydicarbonate (EHPDC) as an initiator to a monomer mixture prepared by blending 80 parts by weight of a 2-ethylhexyl acrylate, 5 parts by weight of an acrylic acid, and 15 parts by weight of an isobornyl acrylate, and by bulk polymerizing the resulting mixture to have a conversion ratio of approximately 99 wt %. A composition (C) having viscosity at room temperature of approximately 1,200 cps was prepared by blending 99 parts by weight of the prepared partial polymer, 0.5 parts by weight of a TPO photoinitiator, and 0.5 parts by weight of 1,6-hexanediol diacrylate.

Preparation Example 4

Preparation of Composition (D)

A syrup-phase partial polymer having a molecular weight measured by GPC of approximately 80,000 was prepared by adding a suitable amount of di(2-ethylhexyl) peroxydicarbonate (EHPDC) as an initiator to a monomer mixture prepared by blending 70 parts by weight of a butyl acrylate and 30 parts by weight of an isobornyl acrylate, and by bulk polymerizing the resulting mixture to have a conversion ratio of approximately 99 wt %. A composition (D) having viscosity at room temperature of approximately 20 cps was prepared by blending 99 parts by weight of the prepared partial polymer, 0.5 parts by weight of a TPO photoinitiator, and 0.5 parts by weight of 1,6-hexanediol diacrylate.

Preparation of Pressure-sensitive Adhesive Product

Example 1

A first layer was formed by coating a composition (A) by comma coating to have a thickness after curing of approximately 50 μm, and a second layer was formed by directly coating a composition (B) by inkjetting on the first layer to have a thickness after curing of approximately 15 μm while the first layer was continuously transferred at a rate of approximately 1 m/min. Subsequently, a pressure-sensitive adhesive product was prepared by radiating UV rays using a black light lamp for approximately 3 minutes while a multilayered structure including the first layer and the second layer formed thereon was continuously transferred at a rate of approximately 1 m/min. In the prepared pressure-sensitive adhesive product, a first surface formed by the first layer became a hard surface without pressure-sensitive adhesiveness, and a second surface formed by the second layer became a pressure-sensitive adhesive surface having pressure-sensitive adhesiveness.

Example 2

A first layer was formed by coating a composition (C) by comma coating to have a thickness after curing of approximately 50 μm, and a second layer was formed by directly coating a composition (D) by inkjetting on the first layer to have a thickness after curing of approximately 15 μm while the first layer was continuously transferred at a rate of approximately 1 m/min. Subsequently, a pressure-sensitive adhesive product was prepared by radiating UV rays using a black light lamp for approximately 3 minutes while a multilayered structure including the first layer and the second layer formed thereon was continuously transferred at a rate of approximately 1 m/min. In the prepared pressure-sensitive adhesive product, according to the result obtained by measuring peeling strengths of a first surface formed by the first layer and a second surface formed by the second layer with respect to glass by the same methods, the peeling strength of the first surface with respect to glass was approximately 2,200 gf/inch, the peeling strength of the second surface with respect to glass was approximately 1,100 gf/inch, and therefore it was confirmed that the pressure-sensitive adhesive product had different physical properties on both surfaces.

While the invention has been shown and described with reference to certain exemplary embodiments thereof, it will be understood by those skilled in the art that various changes in form and details may be made therein without departing from the scope of the invention as defined by the appended claims.

The invention claimed is:

1. A method of preparing a pressure-sensitive adhesive product, comprising:
   forming a layer of a first composition on a base layer or a release surface of a releasable base layer; and
   forming a layer of a second composition on the layer of first composition to form a multilayered structure; and
   curing or crosslinking the multilayered structure including the layer of first composition and the layer of second composition, wherein the curing or crosslinking rate is controlled such that diffusion occurs between components of the compositions included in the layer of the first composition and the layer of the second composition thereby generating a gradient of a polymer, an oligomer, a monomer, a crosslinking agent, an initiator, or an additive in a thickness direction between the layer of the first composition and the layer of the second layer before the curing or crosslinking is ended, wherein:
   the first or the second composition is a pressure-sensitive adhesive composition;
   the second composition has viscosity at room temperature of 10 to 70 cps; and
   a difference in viscosity at room temperature between the first composition and the second composition is 500 cps or more.

2. The method according to claim 1, wherein the first composition has a higher viscosity than the second composition.

3. The method according to claim 1, wherein the difference in viscosity at room temperature between the first composition and the second composition is 1,000 cps or more.

4. The method according to claim 1, wherein the difference in viscosity at room temperature between the first composition and the second composition is 1,150 cps or more.

5. The method according to claim 1, wherein the first composition has viscosity at room temperature of 700 to 30,000 cps.

6. The method according to claim 1, wherein the first and second compositions are solventless compositions.

7. The method according to claim 6, wherein the pressure-sensitive adhesive composition includes a photocurable oligomer and a reactive diluent.

8. The method according to claim 7, wherein the pressure-sensitive adhesive composition further includes a photoinitiator.

9. The method according to claim 1, wherein the pressure-sensitive adhesive composition includes a partial polymer of a monomer mixture including an acryl compound.

10. The method according to claim 9, wherein the acryl compound is a (meth)acrylic acid ester compound.

11. The method according to claim 1, wherein the layer of first composition or the layer of second composition is formed by bar coating, comma coating, roll coating, flow coating, dip coating, blade coating, knife coating, die coating, spin coating, or inkjetting.

12. The method according to claim 1, wherein the layer of first composition is formed by bar coating, knife coating, comma coating, or blade coating, and the layer of second composition is formed by inkjetting.

* * * * *